J. L. VAN NORT.
SELF PROPELLED VEHICLE.
APPLICATION FILED MAR. 12, 1908.
917,684.
Patented Apr. 6, 1909.
3 SHEETS—SHEET 1.
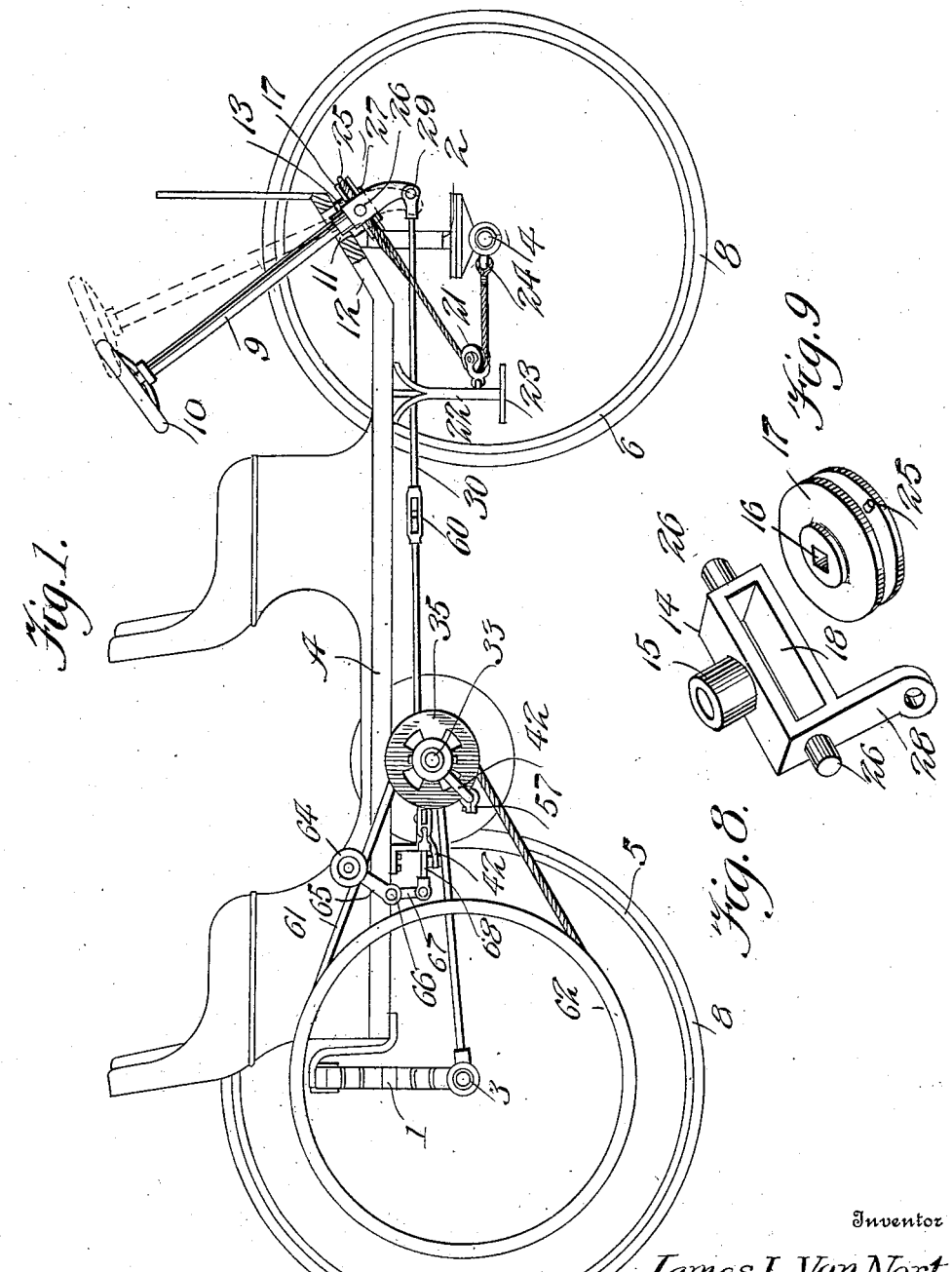
Witnesses
Inventor
James L. Van Nort
By Victor J. Evans
Attorney

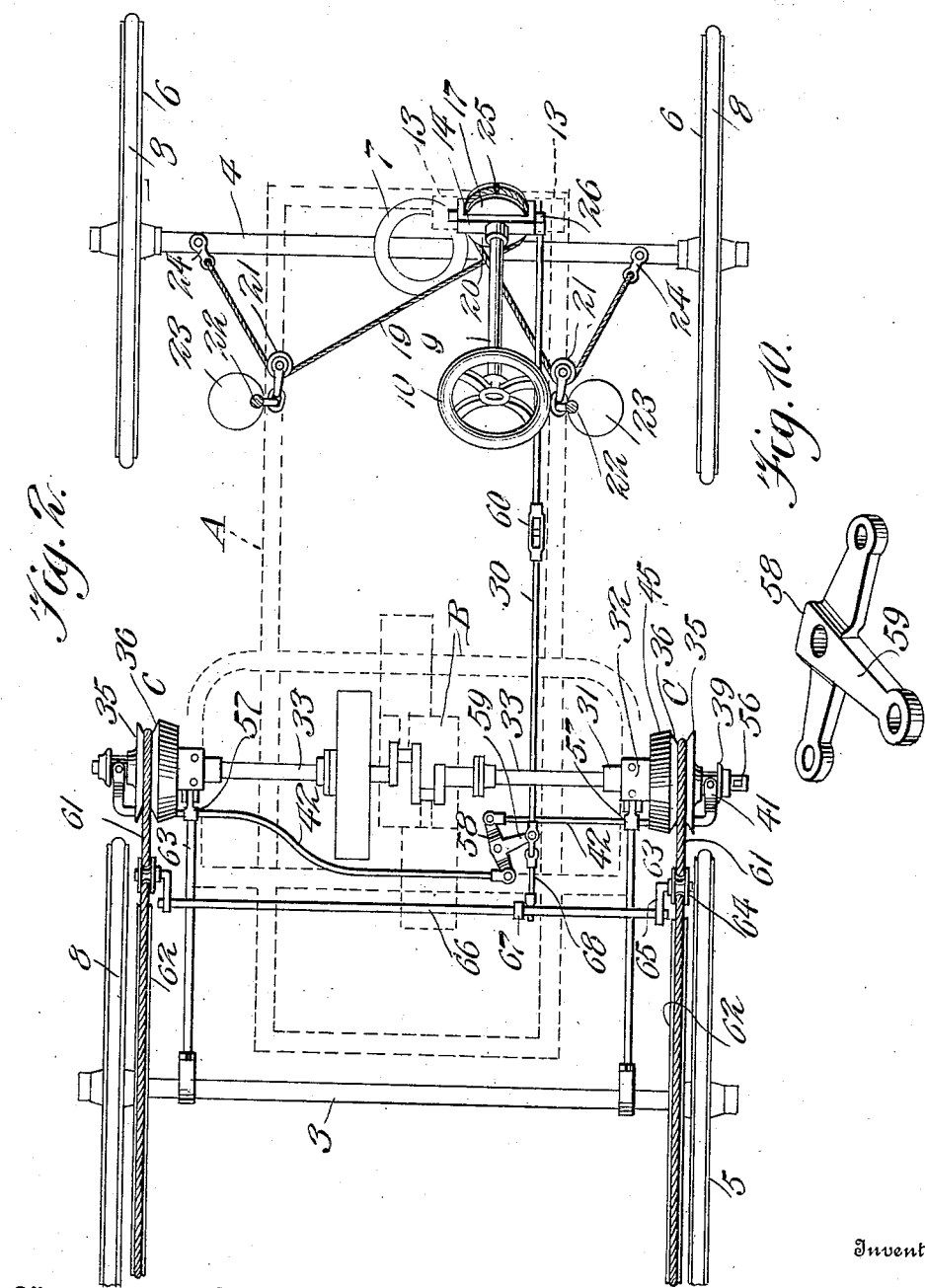

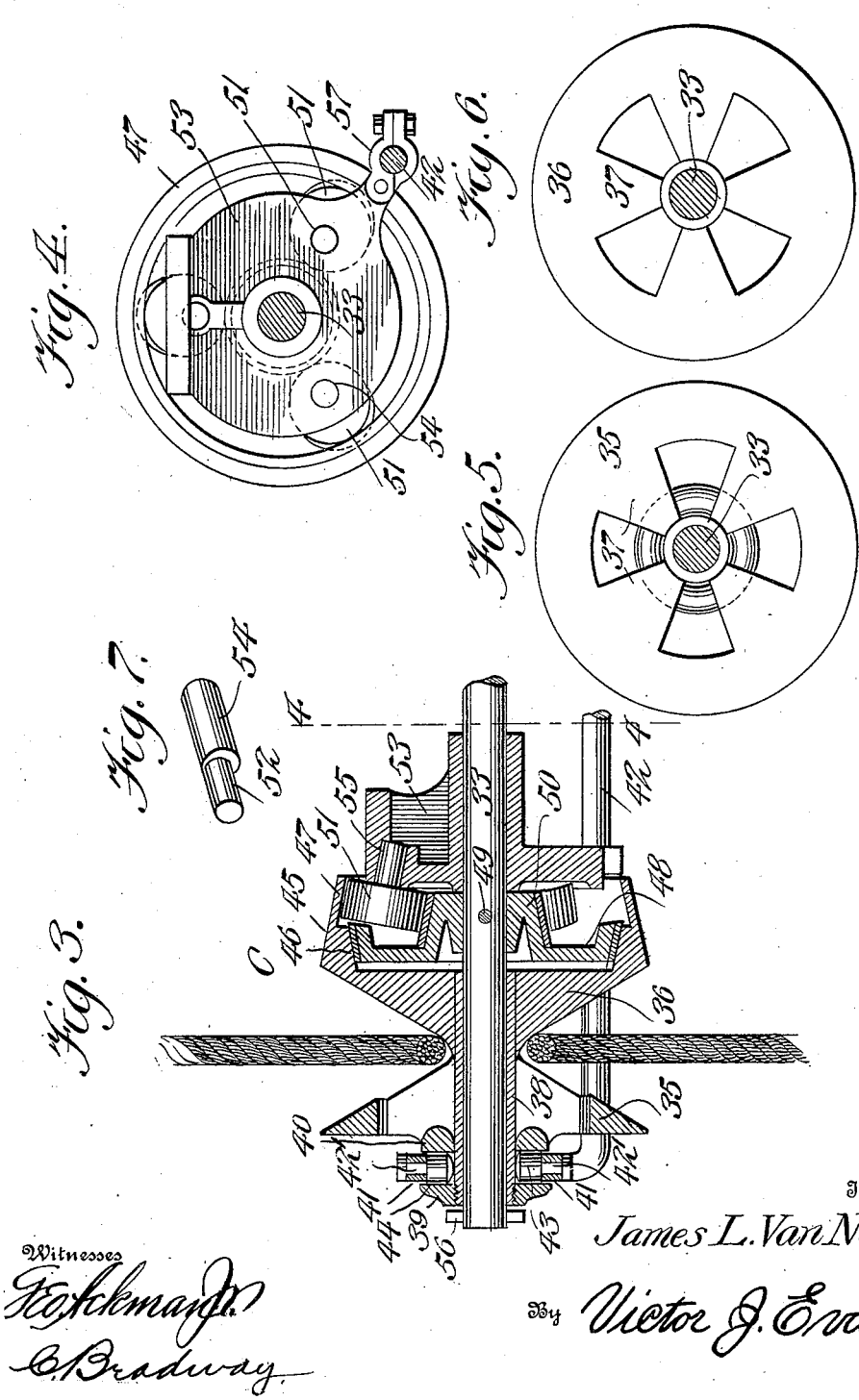

UNITED STATES PATENT OFFICE.

JAMES L. VAN NORT, OF ST. LOUIS, MISSOURI.

SELF-PROPELLED VEHICLE.

No. 917,684.　　　Specification of Letters Patent.　　　Patented April 6, 1909.

Application filed March 12, 1908. Serial No. 420,675.

*To all whom it may concern:*

Be it known that I, JAMES L. VAN NORT, a citizen of the United States, residing at St. Louis city and State of Missouri, have invented new and useful Improvements in Self-Propelled Vehicles, of which the following is a specification.

This invention relates to self-propelled vehicles and more particularly to a power transmitting mechanism of that type including expansible pulleys on the motor shaft or other shaft driven thereby, whereby motion is transmitted to the driving wheels through endless cables passing over the pulleys and over pulleys connected with the driving wheels, and while the invention relates to power-transmitting mechanisms admirably adapted for this use, it is to be understood that it may be employed in other connections.

The invention has for one of its objects to improve and simplify the construction and operation of apparatus of this character so as to be comparatively easy and inexpensive to manufacture, of substantial and durable construction, and manipulated with extreme ease.

A further object of the invention is the provision of a power-transmitting mechanism including expansible pulleys that have combined therewith a reversing means so that a smooth gradation of speed can be obtained and the direction of travel changed gradually, as in stopping the vehicle or instantly so as to produce a brake effect as under emergency conditions for the purpose of suddenly stopping the vehicle to avert an accident.

Another object of the invention is the employment of belt tighteners for the belts or cables arranged between the expansible pulleys and driving wheel pulleys, the said tighteners being connected with the device for expanding and contracting the pulleys so that the belts will be maintained in proper gripping relation as the expansible pulleys are changed in diameter to effect the various speeds.

An additional object is to provide a steering mechanism including a post mounted to swing back and forth and connected with the speed-changing and reversing devices and belt tighteners so that no extra levers or pedals will be required in the operation of the automobile.

A still further object is the employment of a steering mechanism consisting of a cable or other flexible element connected with the solid front axle and passing over suitably arranged pulleys, of which one is fixed on the steering post and rigidly connected with the said cable so that by rotation of the post the vehicle can be properly guided, the said flexible element providing sufficient flexibility to afford a swinging movement of the post whereby the power-transmitting mechanism of the automobile can be controlled.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one of the embodiments of the invention, Figure 1 is a side view of an automobile equipped with improved power-transmitting mechanism. Fig. 2 is a plan view thereof with the body removed. Fig. 3 is a central longitudinal sectional view of one of the expansible pulleys and combined clutch and reversing device, drawn on an enlarged scale. Fig. 4 is a sectional view on line 4—4, Fig. 3. Figs. 5 and 6 are elevations of the two sections of an expansible pulley. Fig. 7 is a perspective view of one of the pivots of a clutch wheel. Fig. 8 is a perspective of the cradle for the steering post. Fig. 9 is a perspective view of the pulley mounted in the cradle and secured to the steering post. Fig. 10 is a similar view of the lever for actuating the shippers of the transmitting mechanism and the belt tighteners.

Similar reference characters are employed to designate corresponding parts throughout the several views.

In the present instance, I have elected to illustrate the invention in connection with an automobile of the surrey type but it is to be understood that it can be embodied in other well known types.

Referring to the drawings, A designates the body of the vehicle which is supported by springs 1 and 2 on the rear and front axles 3 and 4 respectively, the former having driving wheels 5 and the latter steering wheels 6. The front axle is of the ordinary buggy construction and has a fifth wheel 7, whereby the front axle turns on a central pivot. The front wheels are large in diameter so that the vehicle will run more smoothly and not be influenced by ordinary obstructions in the road-bed, and at the same time the usual more or less expensive and complicated steering knuckles are obviated. The rear axle 3 is rigidly secured and the wheels 5 rotate on the spindles thereof like ordinary buggy wheels, and both sets of wheels are preferably shod with cushion or other elastic tires 8.

Mounted on the vehicle body A in front of the forward seat is a steering post 9 equipped with a steering wheel 10 at its upper end and extending through an opening 11 in the foot-board 12 and mounted on the under side of the foot-board is a bracket 13 that carries a cradle 14 which, as shown in Fig. 8, has a hollow boss 15 forming a socket in which the lower end of the steering post rotates. The lower end of the steering post is of non-circular cross-section to fit in the non-circular opening 16 of the grooved wheel or pulley 17, Fig. 9, the said pulley being disposed in the chamber 18 of the cradle 14. Passing over the pulley 17 is a cable or other flexible element 19 that extends rearwardly from both sides of the pulley and crosses at the point 20, Fig. 2, and the two ends pass around pulleys 21 attached to the shanks 22 of the steps 23 and the extremities are connected by links 24 to the front axle 4 at points adjacent the front wheels. The cable 19 is preferably fastened to the pulley 17 by a pin 25 or other equivalent means, so that the cable will not slip as the steering post is turned in one direction or the other for guiding the movement of the vehicle. By employing a flexible element such as the cable 19, the shocks received by the front wheels are not transmitted to a perceptible degree to the steering post. The steering post is adapted to have a tilting movement forwardly and backwardly for the purpose of controlling the power-transmitting mechanism as will be hereinafter more fully explained, and for this purpose the cradle 14, Fig. 8, is provided with trunnions 26 that engage in openings or bearings 27 of the bracket 13, so that the steering post will swing on a horizontal axis. The cradle has a depending arm 28 to which is pivoted, at 29, a rod 30 disposed under the body of the vehicle and extending rearwardly to connect with the operating parts of the power-transmitting mechanism, whereby the speed, direction of travel, and stoppage of the vehicle can be effected solely by the steering post and without the necessity of the usual levers and pedals.

Disposed under the vehicle body and mounted in bearings 31 of depending brackets 32 on the vehicle body is a transverse driving shaft 33 that is connected with the gasolene or other motor B, Fig. 2, which is suitably attached to the vehicle body or frame. On the ends of the driving shaft 33 are power-transmitting devices C for imparting motion to the rear or driving wheels 5 of the vehicle. Each mechanism C consists of an expansible pulley and a combined clutch and reversing device so that the driving shaft can rotate independently, as when the vehicle is stopped and the engine continues running and so that the driving shaft can drive the rear wheels 5 in either direction. The expansible pulley consists of two conical sections 35 and 36 that have radial arms 37 disposed in staggered relation and those of one section interlapping with those of the other section, so that as the sections are moved toward each other, the effective diameter of the pulley is increased and vice versa when the sections are moved away from each other. The section 35 slides back and forth on a tubular axle 38 fixed on the section 36 and surrounding the extremity of the driving shaft 33, and on the tubular axle is a removable collar 39 that is spaced from the hub 40 of the section 35 so as to constitute an annular race or groove for receiving the bifurcations 41 of the shipper or actuating rod 42. The bifurcations 41 are provided with bolts 42' or equivalent means that form pivots for anti-friction rollers 43 that are disposed in the annular race 44. When the rod 42, Fig. 3, is shifted to the right, the section 35 of the expansible pulley is moved toward the section 36 so as to thereby increase the diameter of the pulley and increase the speed of the vehicle, and when the rod 42 is moved in the opposite direction, the element 35 will slide outwardly and thus permit the pulley to contract.

The clutch and reversing device comprises a hollow drum 45 formed on or secured to the section 36 of the expansible pulley and provided with two oppositely-inclined internal conical surfaces 46 and 47 that form gripping faces. Housed within the drum is a clutch wheel 48 that is rigidly secured to the engine shaft 33, as by a pin 49, and the periphery of the wheel is shaped to engage the gripping face 46. The hub 50 of the wheel 48 is formed into the frustum of a cone and interposed between this hub and the gripping face 47 are clutching elements such as rollers 51 that are loosely mounted on pivots 52 carried by the bracket 53. As shown in Fig. 7, each pivot is provided with an eccentric 54 that is free to rotate in an opening 55 of the bracket 53, whereby the rollers 51 can freely shift themselves for gripping both the hub 50 and face 47. The pivots 52 are inclined toward the shaft 33 and the rollers 51 have their cylindrical faces parallel with the outer face of the hub 50 and the gripping face 47. Normally, the wheel 48 and rollers 51 will be out of engagement with the drum 45 so that the shaft 33 can rotate together with the wheel 48 without transmitting motion to the expansible pulley. By imparting a slight movement to the shifting rod 42 toward the right, the gripping face 46 will be engaged with the periphery of the wheel 48 so as to cause the expansible pulley to rotate forwardly with the driving shaft and if the stress on the rod 42 is increased, the pulley will be expanded so as to increase the speed of the vehicle, the parts being maintained in clutching position by holding the rod 42 under stress. When the parts are in normal position and it is desired to reverse the direction of travel, the rod 42 is shifted to the left so as to move the section 36 in the same direction for causing the gripping face 47 of the clutch to engage the rollers 51, whereby the wheel 48 will be clutched to the expansible pulley and drive the latter reversely. The movement of the rod 42 to the left, Fig. 3, is limited by the collar 39, and on the shaft 33 is provided a pin for engagement by a crank for starting the engine. The shifting rods 42 are mounted for longitudinal movement in brackets or bearings 57 mounted on the brackets 32 and the inner ends of the said rod are pivotally connected with a T-shaped lever 58, Figs. 2 and 10. The arm 59 of this lever is connected with the link 30 and included in this link is a turn buckle 60 so as to effect the proper adjustment of the parts.

When the steering post is in central position, the clutches of the power-transmitting device will be opened so that the engine can operate without moving the vehicle, and by tilting the post rearwardly, the clutches will be thrown in so as to drive the vehicle forwardly first at minimum speed and as the rearward tilting of the steering post is continued, the speed can be brought up to maximum with perfect smoothness. By tilting the steering post forwardly of the central or neutral position, the clutches will be thrown in for reversing the direction of travel. The direction in the travel of the vehicle can be changed instantly and with great ease, and in case it is desired to quickly stop the vehicle to avoid an accident, it is merely necessary to throw the steering post forwardly to its full extent so as to thereby reverse the driving wheels 5.

Passing over the expansible pulleys of the power-transmitting mechanisms C are endless cables 61 that pass over large grooved pulleys 62 secured to the rear driving wheels of the vehicle. As the expansible pulleys are expanded or contracted, the grip of the cable 61 is maintained by belt tighteners 63 each consisting of an idle pulley 64 mounted on a crank 65, the cranks being secured to the ends of a rock shaft 66 extending transversely under the vehicle body. On the shaft 66 is a depending crank arm 67 that is connected with the link 30 by a link 68 so that the belt tighteners will move synchronously with the shifting rods 42 for varying the diameters of the expansible pulleys. Thus, as the expansible pulleys are contracted, the belt tighteners are simultaneously operated to take up the slack in the cables or belts 61, and as the pulleys are expanded the belt tighteners move reversely.

From the foregoing description, taken in connection with the accompanying drawings, the advantages of the construction and of the method of operation will be readily apparent of those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims.

Having thus described the invention, what I claim is:—

1. In a self-propelled vehicle, the combination of a propelling element, a change speed device operatively connected therewith, a clutch device, a reversing device, an engine, a steering mechanism including a post mounted to turn for steering the vehicle and to move in opposite directions from a central or neutral position, and connecting means between the steering post and said devices, said means being so arranged as to hold the clutch device open when the steering post is in neutral position and whereby a movement of the post in one direction from its neutral position will close the clutch device and increase the speed of travel forwardly, and a movement of the post in the opposite direction from the central position will operate the reversing device to drive the vehicle rearwardly.

2. In a self-propelled vehicle, the combination of a power-transmitting mechanism including an expansible pulley and a belt passing around the same, a device for expanding and contracting the pulley, a belt tightener separate from the pulley and directly engaging the belt, and a common means for simultaneously actuating the device and tightener.

3. In a self-propelled vehicle, the combination of a power-transmitting mechanism including an expansible pulley and belt passing around the same, a belt tightener arranged to directly engage the belt, a device for expanding and contracting the pulley, a steering post mounted for movement, and means between the post and tightener and device for actuating the two latter simultaneously.

4. In a self-propelled vehicle, the combination of a power-transmitting mechanism including an expansible pulley and a clutch device, a belt passing around the pulley, a belt tightener, a device for simultaneously controlling the clutch device and pulley, a tiltable steering post, and connecting means attaching the post to the belt tightener and said controlling device for simultaneously actuating the tightener and device.

5. In a self-propelled vehicle, the combination of a driving shaft, expansible pulleys mounted thereon, endless belts passing over the pulleys, tighteners for the belts arranged to directly engage the same, and means connected with both the pulleys and tighteners for simultaneously expanding or contracting the pulleys and actuating the tighteners.

6. In a self-propelled vehicle, the combination of a driving shaft, expansible pulleys mounted thereon, belts passing over the pulleys, tighteners for the belts, a steering mechanism including a movable post, and means connecting the post with all the pulleys and all the tighteners for simultaneously expanding or contracting the pulleys and actuating the tighteners by the movement of the post.

7. In a self-propelled vehicle, the combination of a motor, a shaft driven thereby, power-transmitting mechanisms including change speed devices and combined reversing and clutching devices, elements for simultaneously controlling the devices, a lever connected with the elements, a tiltable steering post, and a connection between the lever and post for controlling the said devices by the tilting of the post.

8. In a self-propelled vehicle, the combination of a motor, a shaft driven thereby, expansible pulleys on the shaft, combined clutches and reversing devices between the pulleys and shaft, an element for controlling each device and pulley, belts passing over the pulleys, tighteners for the belts, a rock shaft for actuating the tighteners, a movable steering post, means connecting the post with the rock shaft and elements for controlling the tighteners, and pulleys and devices by the movement of the post, and mechanisms connected with the post for steering the vehicle.

9. In a self-propelled vehicle, the combination of a steering axle, wheels thereon, a rotatable and tiltable steering post, an engine, a power transmitting mechanism for driving the vehicle by the engine, means between the post and mechanism for controlling the latter, a flexible element connected at a point intermediate its ends with the post and extending rearwardly and crossing at a point behind the post, guiding means secured to the vehicle at a point behind the axle and arranged to support the flexible element intermediate the said point of crossing and extremity, and means for connecting the extremities of the element to the axle adjacent the wheels.

10. In a self-propelled vehicle, the combination of a steering axle, a steering post, means for supporting the post to tilt on a horizontal axis, a grooved wheel on the post, a flexible element connected with the wheel and connected with the axle, means for guiding the element to transmit movement to the axle from the post, a mechanism for driving the vehicle at different speeds and in different directions and including a clutch, and a connection between the steering post and mechanism for controlling the latter by the tilting of the post.

11. In a power-transmitting mechanism, the combination of an expansible pulley comprising relatively movable sections, a driving shaft on which the sections are loosely mounted, and a clutch device for clutching the pulley to the shaft, with a single controller for both the pulley and clutch device.

12. In a power-transmitting mechanism, the combination of an expansible pulley including movable sections, a tubular axle on one section and on which the other section slides a shaft on which the sections are loosely mounted and extending through the axle, an element connected with the axle for moving the sections to expand or contract the pulley, and a clutch device between the shaft and pulley and arranged to drive the latter forwardly when the element is moved in one direction.

13. In a power-transmitting mechanism, the combination of an expansible pulley including relatively-movable sections, a tubular axle on one section for slidably holding the other section, a driving shaft passing through the axle, a clutch device for connecting the shaft with the section having the tubular axle, and a controller for moving the sections to vary the diameter of the pulley and acting through the latter to control the clutch.

14. In a power-transmitting mechanism, the combination of a pulley including relatively-movable sections, a tubular axle on one of the sections for slidably holding the other, a removable collar on the axle and spaced from the hub of the slidable section, a shaft passing through the axle, means for connecting the axle-carrying section to the shaft, and a bifurcated element engaging between the collar and hub of the slidable section for moving the sections to vary the diameter of the pulley.

15. In a power-transmitting mechanism, the combination of a support, a rotatable shaft mounted thereon, a drum loosely mounted on the shaft and having oppositely-disposed internal gripping faces, a cone wheel keyed to the shaft and adapted to engage one of the said internal faces of the drum and provided with a conical hub, rollers loosely mounted on the support with their axes inclined to the axis of the shaft and arranged to engage the other internal face and said drum, and means for moving the drum for connecting the latter directly with the said wheel or indirectly therewith through the rollers.

16. In a power-transmitting mechanism, the combination of a support, a rotatable shaft mounted thereon, a drum loosely mounted on the shaft and having oppositely-disposed internal gripping faces, a cone wheel keyed to the shaft and adapted to engage one of the said internal faces of the drum and provided with a conical hub, rollers arranged to engage the other internal face and said hub, pivots for the rollers which are loosely mounted on the support to permit self adjustment of the rollers for gripping the faces of the wheel and drum an expansible pulley consisting of relatively-movable sections one of which is connected with the drum, and an element for moving the sections to vary the diameter of the pulley and operating through the latter for connecting the drum directly with the said wheel or indirectly therewith through the said rollers.

17. In a power-transmitting mechanism, the combination of a support, a rotatable shaft mounted thereon, a drum loosely mounted on the shaft and having oppositely-disposed internal gripping faces, a cone wheel keyed to the shaft and adapted to engage one of the said internal faces of the drum and provided with a conical hub, rollers disposed between the other internal face and said hub, pivots for the rollers, eccentrics on the pivots loosely mounted in bearing openings on the support and arranged to permit the rollers to move in a direction transverse to their axes of rotation for gripping the hub and internal face of the said wheel and drum, and means for moving the drum to connect the latter directly with the said wheel or indirectly therewith through the rollers.

In testimony whereof I affix my signature in presence of two witnesses.

JAMES L. VAN NORT.

Witnesses:
    JOHN L. FLETCHER,
    CHATTIN BRADWAY.